United States Patent
Takahashi et al.

(10) Patent No.: US 7,630,515 B2
(45) Date of Patent: Dec. 8, 2009

(54) METHOD OF AND APPARATUS FOR SETTING IMAGE-CAPTURING CONDITIONS, AND COMPUTER PROGRAM

(75) Inventors: Kunikazu Takahashi, Kawasaki (JP); Tomoyuki Harada, Yokohama (JP); Yuji Nishimaki, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 567 days.

(21) Appl. No.: 10/851,160

(22) Filed: May 24, 2004

(65) Prior Publication Data

US 2005/0169500 A1    Aug. 4, 2005

(30) Foreign Application Priority Data

Jan. 30, 2004    (JP)    ............... 2004-023164

(51) Int. Cl.
G06K 9/00    (2006.01)
(52) U.S. Cl. .............. 382/104; 382/103; 382/105; 340/933
(58) Field of Classification Search ............. 382/104
See application file for complete search history.

(56) References Cited

U.S. PATENT DOCUMENTS

| | | | |
|---|---|---|---|
| 4,884,072 A | | 11/1989 | Horsch |
| 5,699,056 A | * | 12/1997 | Yoshida ............... 340/905 |
| 5,764,786 A | | 6/1998 | Kuwashima et al. |
| 6,079,862 A | * | 6/2000 | Kawashima et al. ....... 382/103 |
| 6,188,329 B1 | * | 2/2001 | Glier et al. ............ 707/104.1 |
| 6,690,294 B1 | * | 2/2004 | Zierden ................ 340/937 |
| 6,760,061 B1 | * | 7/2004 | Glier et al. ............. 348/149 |
| 6,958,709 B2 | * | 10/2005 | Izbicki et al. ........... 340/994 |
| 6,970,102 B2 | * | 11/2005 | Ciolli .................. 340/933 |
| 2002/0054210 A1 | | 5/2002 | Glier et al. |
| 2005/0033505 A1 | * | 2/2005 | Zatz ................... 701/117 |

FOREIGN PATENT DOCUMENTS

| | | |
|---|---|---|
| JP | 63-501177 | 4/1988 |
| JP | 06-187591 A | 7/1994 |
| JP | 7-114642 | 5/1995 |
| JP | 2001-357402 | 12/2001 |
| JP | 2002-063686 | 2/2002 |
| JP | 2002-541536 | 12/2002 |
| JP | 2003-161980 | 6/2003 |

(Continued)

OTHER PUBLICATIONS

Xue et al., "An Intelligent Contraflow Control Method for Real-Time Optimal Traffic Scheduling Using Artificial Neural Network, Fuzzy Pattern Recognition, and Optimization", Jan. 2000, IEEE Transactions on Control Systems Technology, vol. 8, No. 1, 183-191.*

(Continued)

*Primary Examiner*—Brian P Werner
*Assistant Examiner*—Katrina Fujita
(74) *Attorney, Agent, or Firm*—Staas & Halsey LLP

(57) ABSTRACT

An apparatus for setting an image-capturing condition includes a travel direction storing unit that receives information on a travel direction of a moving object, and stores the information received, and an image-capturing condition setting unit that sets, based on the information stored, a condition for capturing an image that includes identification data for identifying the moving object.

13 Claims, 13 Drawing Sheets

FOREIGN PATENT DOCUMENTS

| | | |
|---|---|---|
| JP | 2003-281689 | 10/2003 |
| JP | 2003-288678 | 10/2003 |
| JP | 2003-022494 A | 1/2004 |
| WO | 00/46775 | 8/2000 |

OTHER PUBLICATIONS

Japanese Office Action mailed on Apr. 21, 2009 in corresponding Japanese Patent Application 2004-023164.

Japanese Office Action mailed Jul. 14, 2009 for corresponding Japanese Patent Application No. 2004-023164.

* cited by examiner

FIG.4

123b TRAVEL DIRECTION DATA

| LANE NO. | TRAVEL DIRECTION |
|---|---|
| 1 | 0 |
| 2 | 1 |

FIG.5

123c IMAGE CAPTURING CONDITION DATA

| LANE NO. | LANE NO. |
|---|---|
| 1 | 0 |
| 2 | 1 |

FIG.7
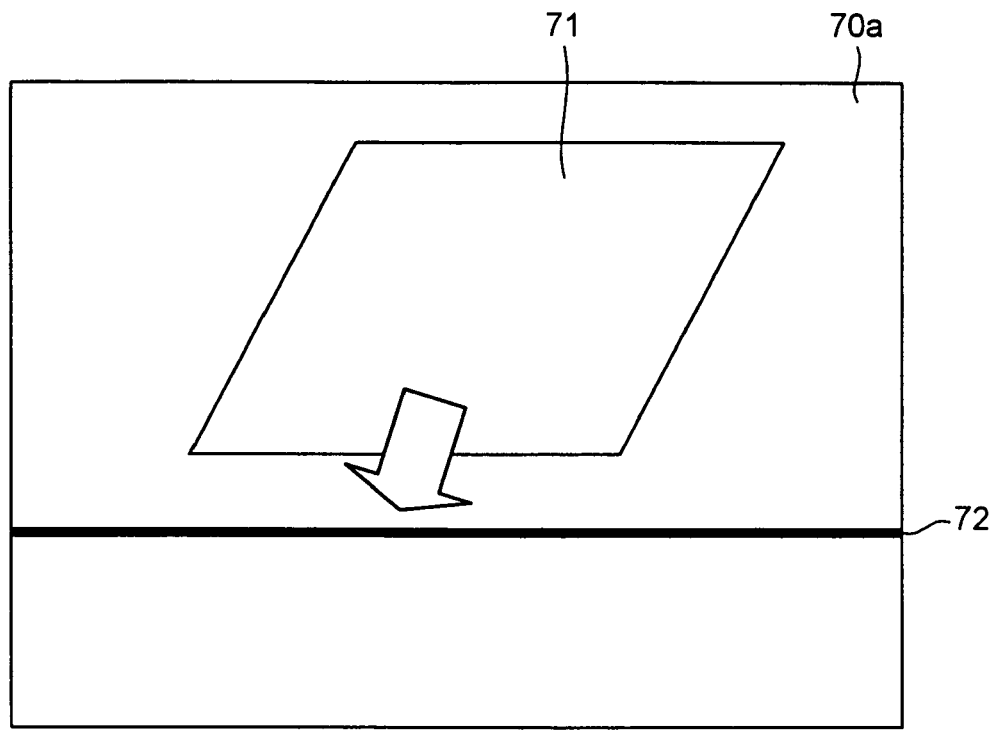
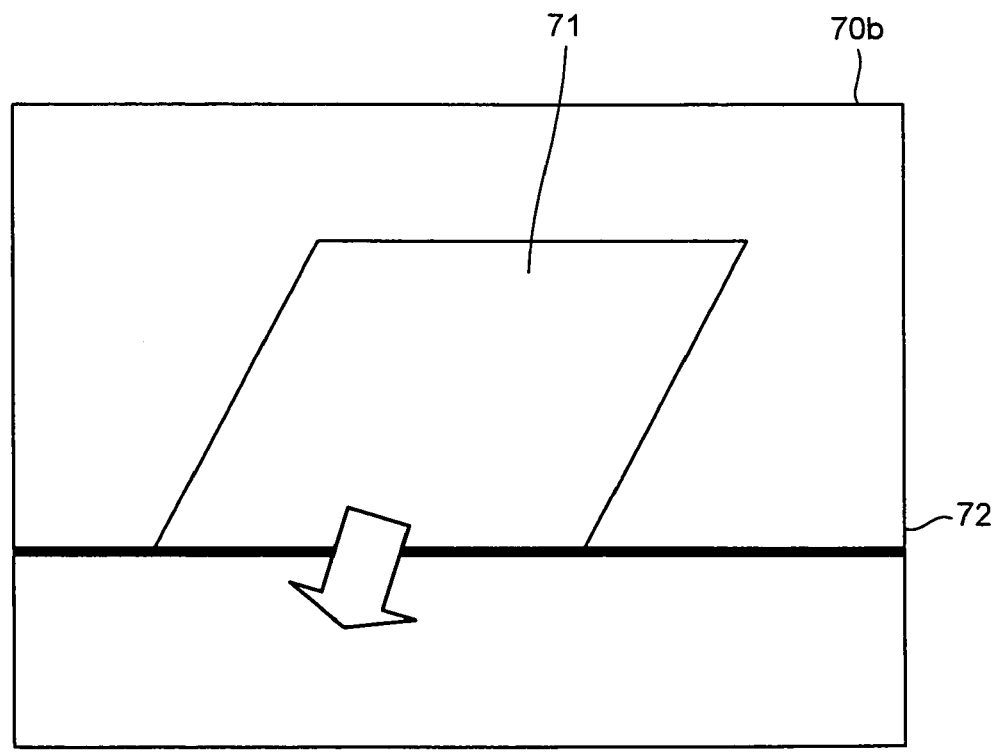

FIG.8
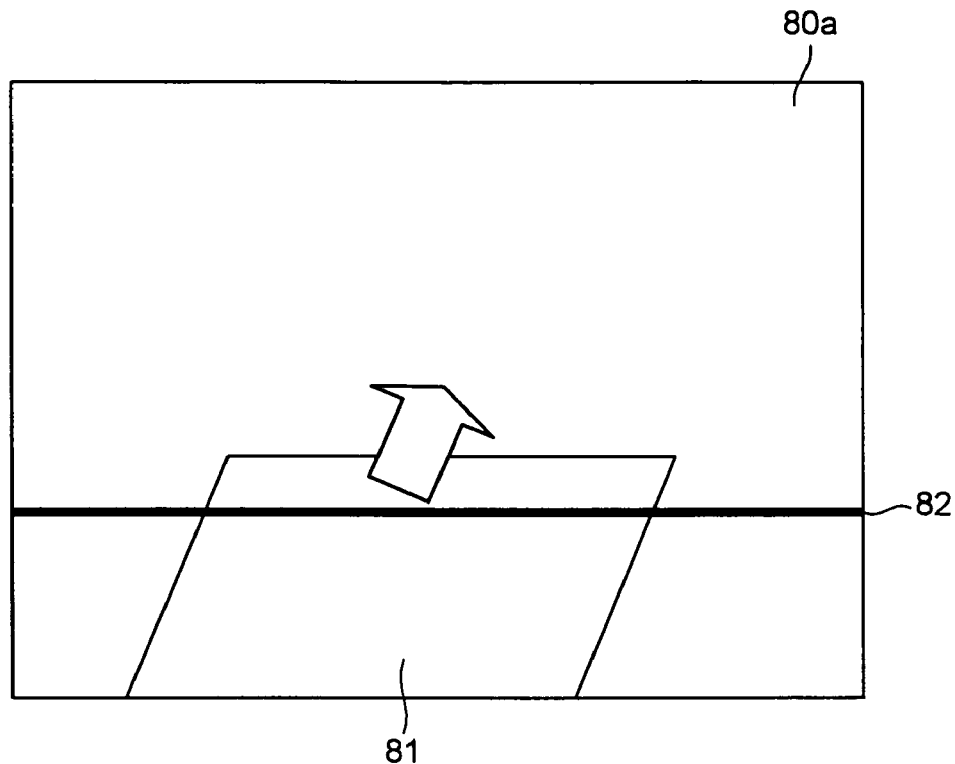
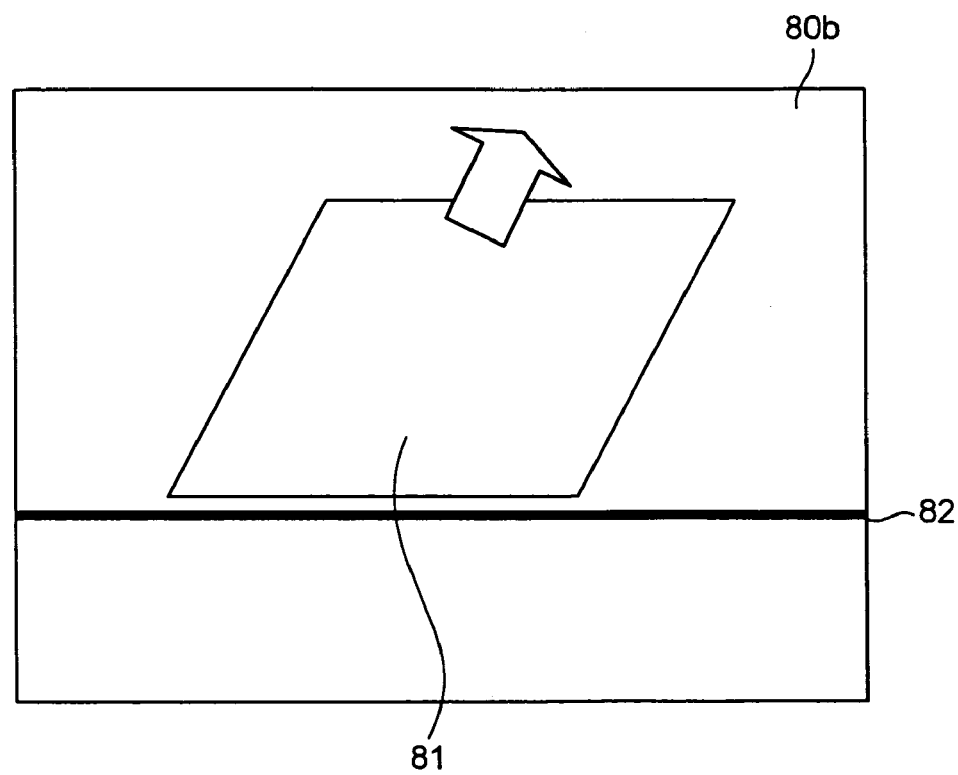

FIG.11

104b DIRECTION CHANGE SCHEDULE DATA

| LANE NO. | TIME SLOT | TRAVEL DIRECTION |
|---|---|---|
| 1 | 8:00-10:00 | 0 |
| 2 | 8:00-10:00 | 1 |
| 1 | 10:00-8:00 | 0 |
| 2 | 10:00-8:00 | 0 |

METHOD OF AND APPARATUS FOR SETTING IMAGE-CAPTURING CONDITIONS, AND COMPUTER PROGRAM

BACKGROUND OF THE INVENTION

1) Field of the Invention

The present invention relates to a technology for setting image-capturing conditions to efficiently recognize identification data of a moving object.

2) Description of the Related Art

Traffic surveillance system to read out registration information written on a license plate of a vehicle is currently used to monitor traffic of vehicles. In the traffic surveillance system, an image of the license plate is captured, and a character recognition process is performed to the registration information on the image captured. The result of the character recognition process with place and time information is stored in a database. Thus, information regarding a specific vehicle's traveling can be easily retrieved from the database.

As an example of the traffic surveillance system, a mobile character recognition system that is portable in a vehicle and setup at an arbitrary place is disclosed in Japanese Patent Laid-Open Publication No. 2003-22494. When searching for a particular vehicle, the mobile character recognition system first checks whether any existing registration information input earlier matches with character-recognized registration information. If matching registration information is found, the mobile character recognition system displays corresponding information.

However, with the conventional technology, it is not possible to adjust conditions such as shooting timing when a road is assigned to one-way road according to time or traffic condition, or when traffic is allowed to flow in the opposite direction on a part of a multi-lane road, resulting in inefficient character recognition of the license plate.

For instance, when a vehicle is approaching a camera, it is desirable to wait until the vehicle gets to a position where the license plate on the front of the vehicle is readable before capturing an image. Likewise, when the vehicle is passing from behind the camera, it is desirable to wait until the vehicle moves away to a position where the license plate on the back of the vehicle is readable before taking the image.

SUMMARY OF THE INVENTION

It is an object of the present invention to solve at least the problems in the conventional technology.

The apparatus for setting an image-capturing condition according to one aspect of the present invention, includes a travel direction storing unit that receives information on a travel direction of a moving object, and stores the information received, and an image-capturing condition setting unit that sets, based on the information stored, a condition for capturing an image that includes identification data for identifying the moving object.

The method of setting an image-capturing condition according to another aspect of the present invention includes steps of receiving information on a travel direction of a moving object, storing the information received, and setting, based on the information stored, a condition for capturing an image that includes identification data for identifying the moving object.

The computer program for setting an image-capturing condition according to still another aspect of the present invention realizes the method according to the above aspect on a computer.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is a block diagram of the recognizing unit 12a;

FIG. 4 is a table of an example of travel direction data 123b shown in FIG. 3;

FIG. 5 is a table of an example of image-capturing condition data 123c shown in FIG. 3;

FIG. 7 is a schematic for illustrating a vehicle detection process by the recognizing units 12a-12c when a vehicle is in an oncoming direction;

FIG. 8 is a schematic for illustrating a vehicle detection process by the recognizing units 12a-12c when a vehicle is in an outgoing direction;

FIG. 11 is a table of an example of change schedule data 104b shown in FIG. 10;

DETAILED DESCRIPTION

Exemplary embodiments of a method of and an apparatus for setting an image-capturing condition according to the present invention are explained below in detail with reference to the accompanying drawings.

Figure 1:
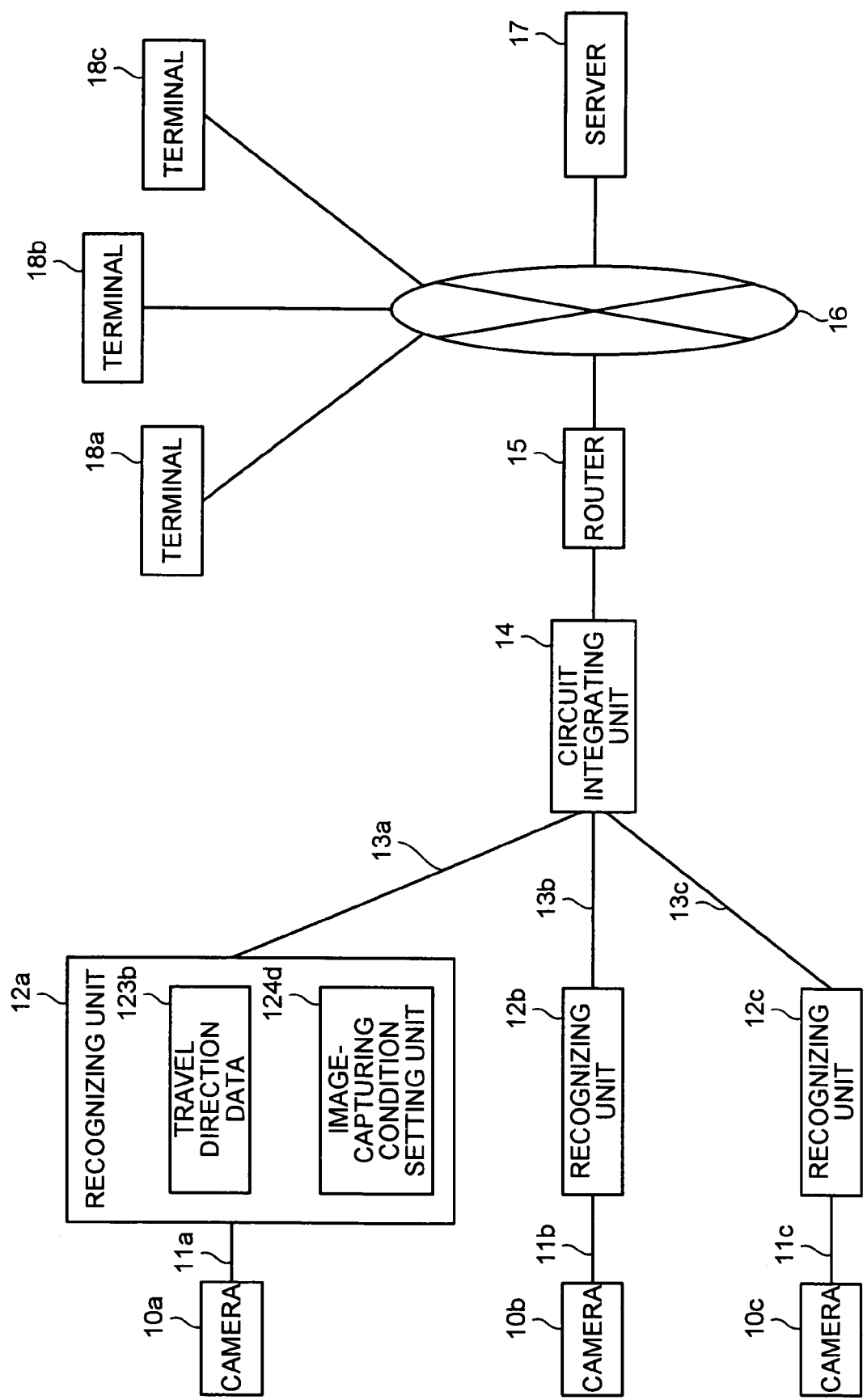
FIG. 1 is a schematic of a character recognition system according a first embodiment of the present invention.

FIG. 1 is a schematic of a character recognition system according a first embodiment of the present invention. In the character recognition system, cameras 10a-10c and a recognizing units 12a-12c are connected via NTSC signal lines 11a through 11c. The recognizing units 12a-12c and a circuit integrating device 14 are connected via dedicated lines 13a through 13c. The circuit integrating device 14 and a server 17 are connected via a router 15 and a local area network 16. The server 17 and terminals 18a-18c are connected via the local area network 16.

The cameras 10a-10c capture images of vehicles. The recognizing units 12a-12c are devices that read from the images captured by the cameras 10a-10c, registration information on license plates of vehicles by a character recognition process.

The recognizing units 12a-12c store information pertaining to travel direction of vehicles in each lane as travel direction data 123b. An image-capturing condition setting unit 124d sets appropriate conditions for capturing images of the registration information on the license plate based on the travel direction data 123b stored. The cameras 10a-10c capture the image of registration information on the license plate based on the set image-capturing conditions.

The registration information that is subjected to the character recognition process by the recognizing units 12a-12c is transmitted, along with information such as place and time where the image of the vehicle is captured, to the server 17 via the router 15 and the local area network 16.

The server 17 adds the registration information of the vehicle transmitted by the recognizing units 12a-12c, along with the information related to place and time where the image is captured, in a database (not shown). When the server 17 receives from users operating terminals 18a-18c information such as registration number of the vehicle the user is seeking information on, the server 17 retrieves from the database and outputs to the terminals 18a-18c information related to the place and time associated with the vehicle.

When the travel direction of the vehicle is changed, the recognizing units 12a-12c of the character recognition system store the information pertaining to the travel direction of the vehicle and sets the image-capturing conditions for the registration information on the license plate based on the stored travel direction information. Consequently, appropriate conditions can be set for capturing images of the registration information on the license plate.

Figure 2:
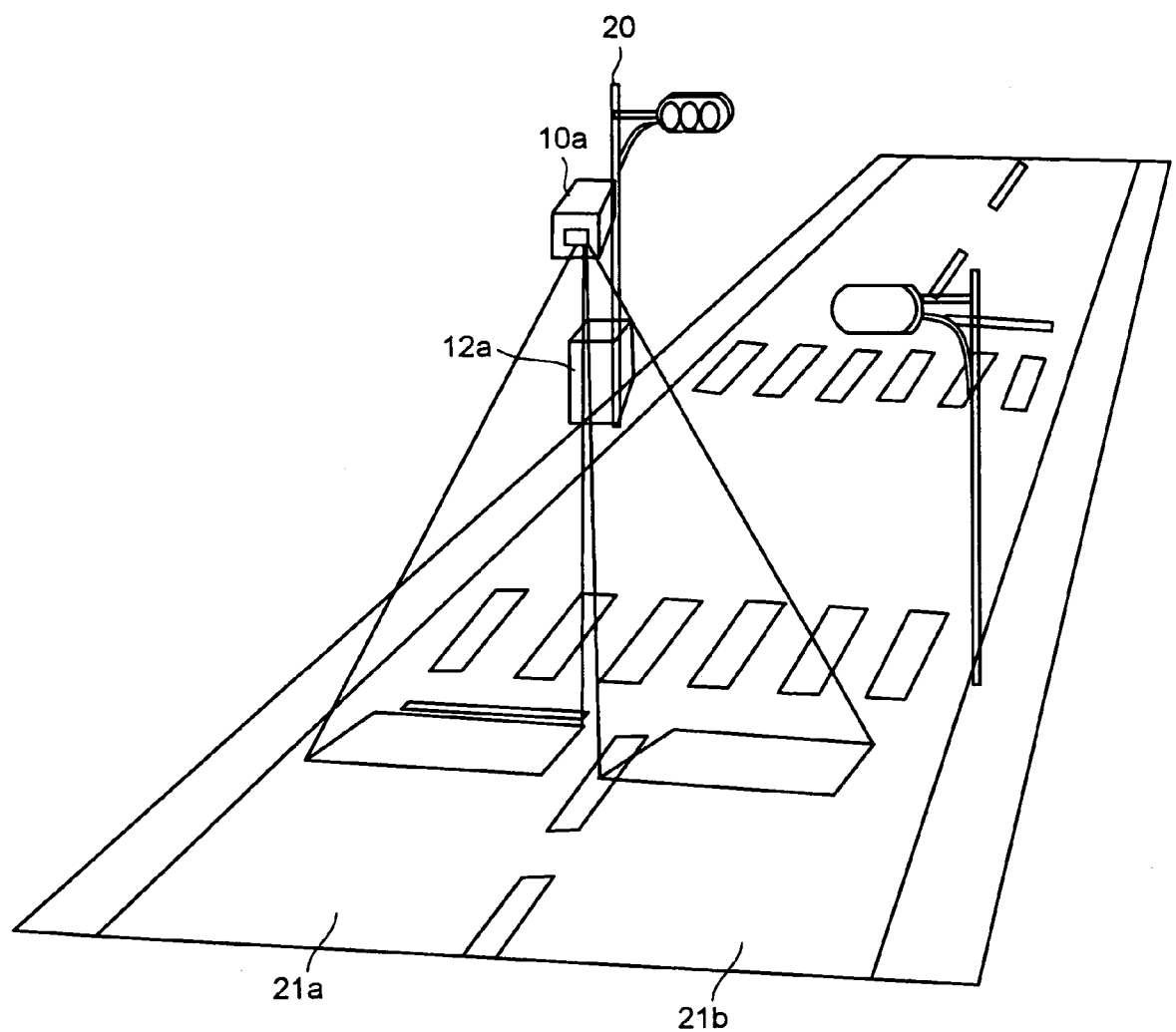
FIG. 2 is a schematic for illustrating a placement of a camera 10a and a recognizing unit 12a shown in FIG. 1.

FIG. 2 is a schematic for illustrating a placement of a camera 10a and a recognizing unit 12a shown in FIG. 1. The camera 10a is mounted on a traffic signal pole 20. The recognizing unit 12a that carries out the character recognition process on the image of the license plate of the vehicle is mounted on a side of the traffic signal pole 20.

The camera 10a is a high resolution camera, and can be used for capturing images of plural lanes 21a and 21b. Thus, reducing the number of cameras serves the purpose of reducing equipment cost as well as making the cameras inconspicuous.

Figure 3:
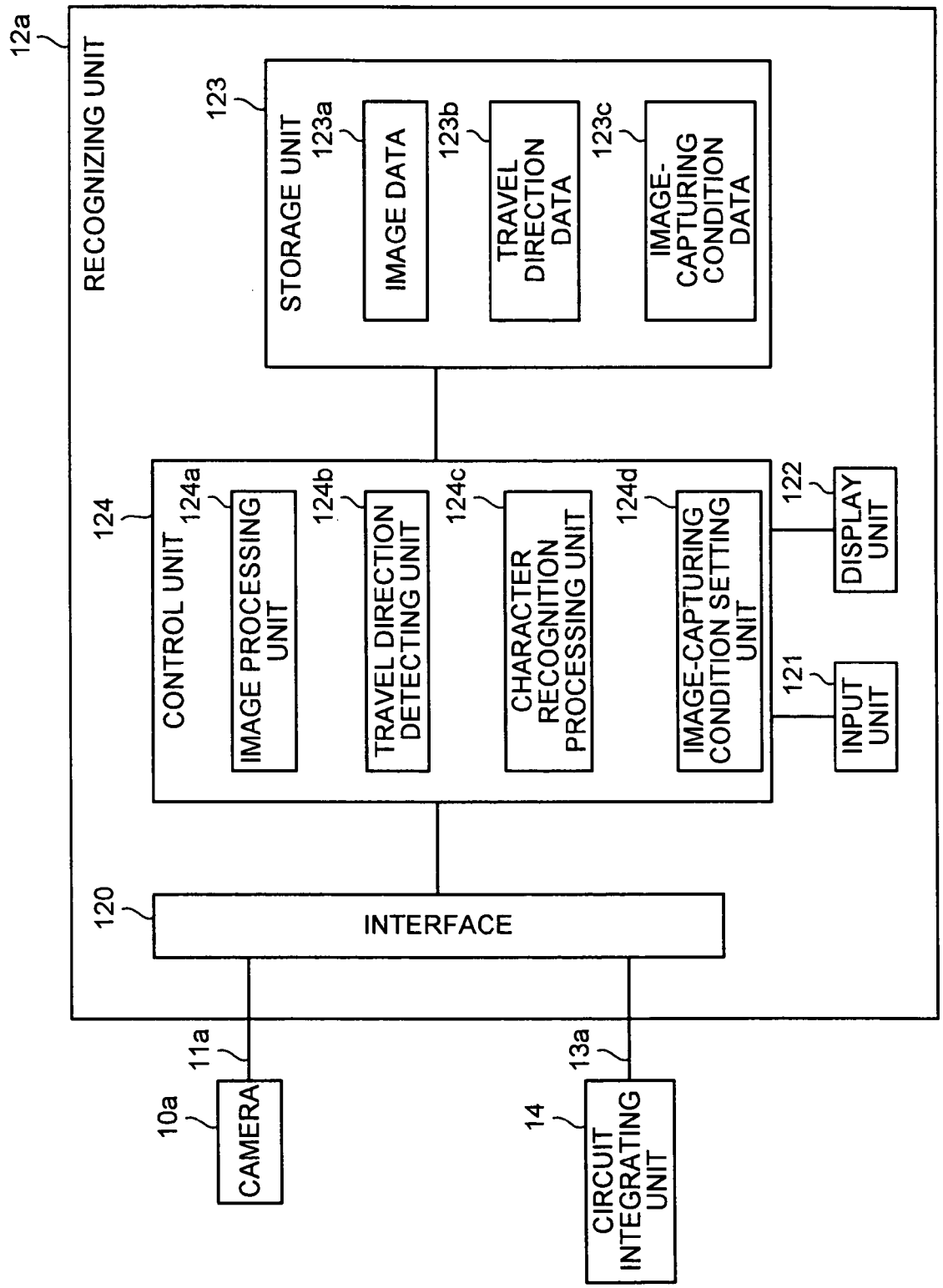

FIG. 3 is a block diagram of the recognizing unit 12a. All the recognizing units 12a-12c are functionally identical. The recognizing unit 12a includes an interface 120, an input unit 121, a display unit 122, a storage unit 123, and a control unit 124.

The interface 120 is a network interface that exchanges data with the camera 10a via the NTSC signal line 11a and with the circuit integrating device 14 via the dedicated line 13a. The input unit 121 is an input device such as a keyboard, mouse. The display unit 122 is a display device such as a monitor.

The storage unit 123 is a storage device such as a hard disk device, memory. The storage unit 123 exchanges data with the control unit 124. The storage unit 123 stores image data 123a, travel direction data 123b, and image-capturing condition data 123c.

The image data 123a is a time-series image data captured by the camera 10a. The travel direction data 123b is data pertaining to the travel direction of the vehicle as determined from an analysis of the image data 123a.

FIG. 4 is a table of an example of travel direction data 123b shown in FIG. 3. The travel direction data 123b includes lane number and travel direction. Lane number pertains to an identification number that is assigned to a lane. Travel direction is a numerical representation of the direction of vehicular movement. For instance, an up direction of the street is represented by "0", and a down direction is represented by "1".

The image-capturing condition data 123c is data pertaining to the conditions set for the camera 10a for capturing images of license plates of vehicles. FIG. 5 is a table of an example of image-capturing condition data 123c shown in FIG. 3.

The image-capturing condition data 123c includes data pertaining to lane number and recognized direction. Lane number pertains to an identification number that is assigned to a lane. Recognized direction is data that the camera 10a refers to when capturing the image of the license plate of the vehicle and indicates data pertaining to the currently recognized travel direction of the vehicle. In the example shown in FIG. 5, "0" is assigned as the recognition number when the travel direction of the vehicle is up; and "1" is assigned as the recognition number when the travel direction of the vehicle is down.

The image-capturing timing is adjusted based on the data pertaining to the recognized direction, since the image-capturing timing for capturing the license plate on the front of the vehicle varies from that of the back of the vehicle.

The control unit 124 controls the entire recognizing unit 12a and includes a captured image processing unit 124a, a travel direction detecting unit 124b, a character recognition processing unit 124c, and an image-capturing condition setting unit 124d.

The captured image processing unit 124a obtains the time-series images captured by the camera 10a and stores them as image data 123a. The captured image processing unit 124a refers to the image-capturing condition data 123c, and controls the camera 10a so that the camera 10a captures the image of the license plate of the vehicle at a predetermined timing according to the travel direction of the vehicle.

In other words, the captured image processing unit 124a refers to the image-capturing condition data 123c and determines whether the license plate on the front or the back of the vehicle is to be captured and issues instruction to the camera 10a to capture images at an appropriate timing. This image-capturing timing is explained in greater detail with reference to FIG. 7 and FIG. 8.

Figure 6:
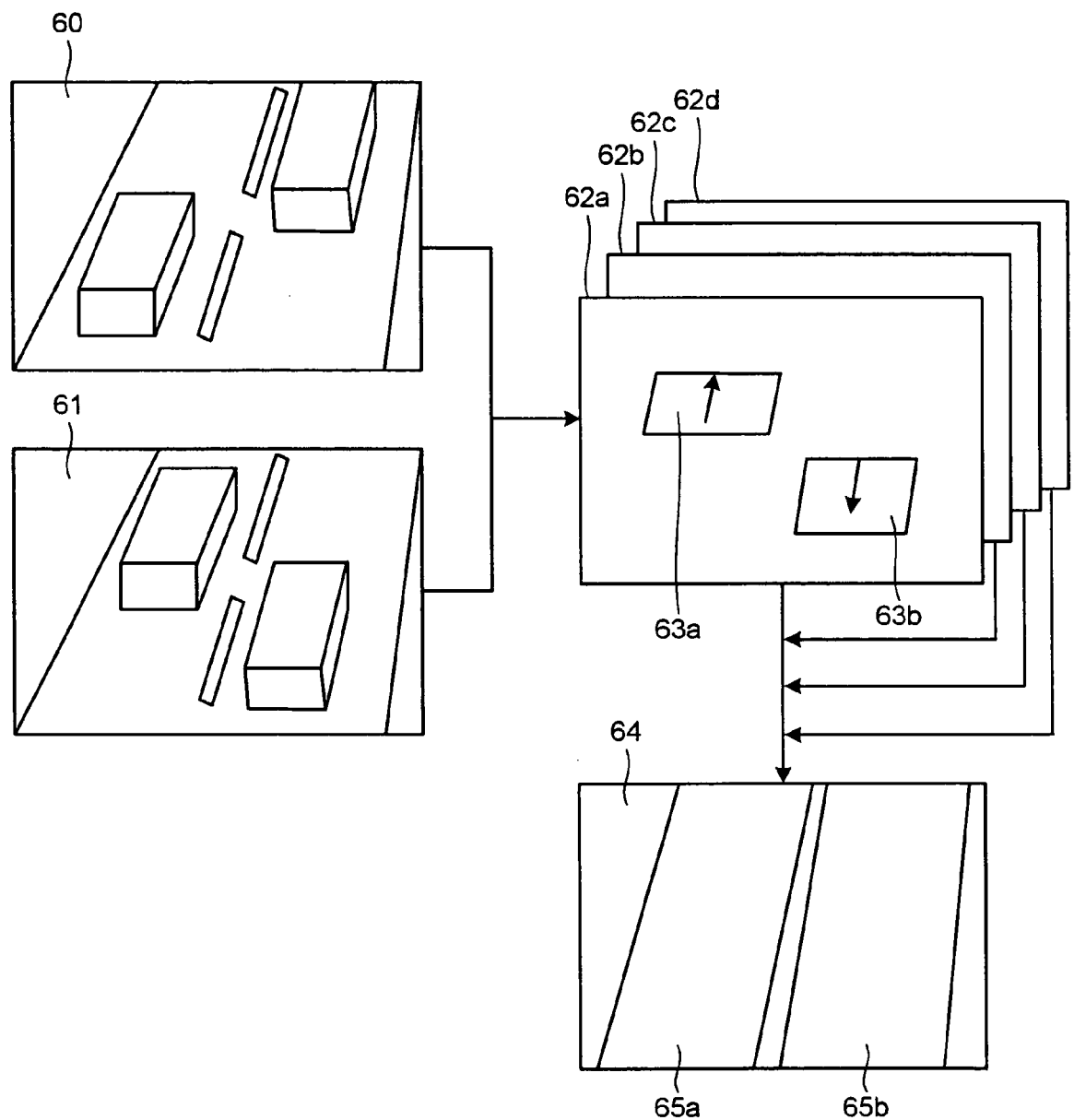
FIG. 6 is a schematic for illustrating a process of image area setting for each lane by the recognizing units 12a-12c.

The travel direction detecting unit 124b detects the travel direction of the vehicle traveling in a lane by analyzing the time-series images of the vehicle stored in the image data 123a. To be more specific, the travel direction detecting unit 124b creates a difference image (that is, difference image obtained from an image captured at time t and another captured at time t−1) from the time-series images in order to detect the travel direction of the vehicle. FIG. 6 is a schematic for illustrating a process of image area setting for each lane by the recognizing units 12a-12c. The travel direction detecting unit 124b then stores the information pertaining to the detected travel direction of the vehicle in the travel direction data 123b.

The character recognition processing unit 124c creates a superimposed image by superposing difference images created by the travel direction detecting unit 124b, and based on the superimposed image, sets an image area of each of the lanes.

During the character recognition process, the character recognition processing unit 124c detects for each set image area the image of the license plate of the vehicle and carries out the character recognition process on the registration information on the license plate. The character recognition processing unit 124 then transmits to the circuit integrating device 14 the character-recognized registration information along with the place and time of the image-capturing.

The image-capturing condition setting unit 124d sets the conditions for the camera 10a to capture images based on the travel direction data 123b stored by the travel direction detecting unit 124b. To be more specific, the image-capturing condition setting unit 124d refers to the travel direction data 123b in order to obtain information related to the travel direction of vehicles in each lane and checks whether this information matches the information pertaining to the recognized direction stored in the image-capturing condition data 123c.

If the data pertaining to travel direction stored in the travel direction data 123b does not match the data pertaining to the recognized direction stored in the image-capturing condition data 123c, the image-capturing condition setting unit 124d carries out an update process. That is, the image-capturing condition setting unit 124d updates the data pertaining to the recognized direction stored in the image-capturing condition data 123c with the data pertaining to travel direction stored in the travel direction data 123b.

The travel direction detecting unit 124b of the recognizing units 12a-12c obtains the time-series images 60 and 61 from the image data 123a. The time-series image 60 is an image captured at time t−1 and the time-series image 61 is an image captured at time t.

The travel direction detecting unit 124b creates a difference image 62a from the time-series image 60 and the time-series image 61, and detects the vehicle-wise moving ranges 63a and 63b. In this way, the travel direction detecting unit 124b creates difference images 62b through 62d from the set of time-series images, extracts information pertaining to vehicle-wise moving range, and travel direction.

The character recognition processing unit 124c then creates a superimposed image 64 by superposing the difference images 62a through 62d. Image areas 65a and 65b for each lane are created in the superimposed image 64 by superposition of the moving ranges 63a and 63b of each lane. In this way, the character recognition processing unit 124c sets the lane-wise image areas 65a and 65b for detecting vehicles.

FIG. 7 is a schematic for illustrating a vehicle detection process by the recognizing units 12a-12c when a vehicle is in an oncoming direction. The recognizing units 12a-12c detect from the difference images created from the time-series images that the vehicle 71 is approaching.

In a time-series image 70a, a boundary line 72 represents a position most appropriate for capturing an image of the license plate on the front of the vehicle 71. The boundary line 72 is set at the beginning of the last one-third distance of an image-capturing area for the camera 10a.

The image-capturing of the vehicle 71 takes place when the front of the vehicle 71 reaches the boundary line 72. The assessment of whether the vehicle 71 has reached the boundary line 72 is done by extracting an edge of the image of the vehicle 71 and checking whether this edge, which represents the front of the vehicle 71, has reached the boundary line 72.

In order to avoid mistaken detection of persons or bicycles, the image-capturing processing unit 124a carries out the vehicle detection process only if the detected area framed by the edge or the detected edge is of a width above a specific value.

FIG. 8 is a schematic for illustrating a vehicle detection process by the recognizing units 12a-12c when a vehicle is in an outgoing direction. In this case, the recognizing units 12a-12c detect from the difference images created from time-series images that the vehicle 81 is advancing.

In a time-series image 80a, a boundary line 82 represents a position most appropriate for capturing an image of the license plate on the back of the vehicle 81. The image-capturing of the vehicle 81 takes place when the back of the vehicle 81 reaches the boundary line 82.

The assessment of whether the vehicle 81 has reached the boundary line 82 is done by extracting an edge of the image of the vehicle 81 and checking whether this edge, which represents the back of the vehicle 81, has reached the boundary line 82.

Further, in order to avoid mistaken detection of persons or bicycles, the image-capturing processing unit 124a carries out the vehicle detection process only if the detected area framed by the edge or the detected edge is of a width above a specific value.

Thus, since the timing for image-capturing of the license plate varies according to whether a vehicle is approaching the camera 10a from the front of the camera 10a or the back of the camera 10a, the image-capturing condition setting unit 124d of the recognizing units 12a-12c changes the conditions of image-capturing of the vehicles in accordance with the travel direction of the vehicle.

Figure 9:
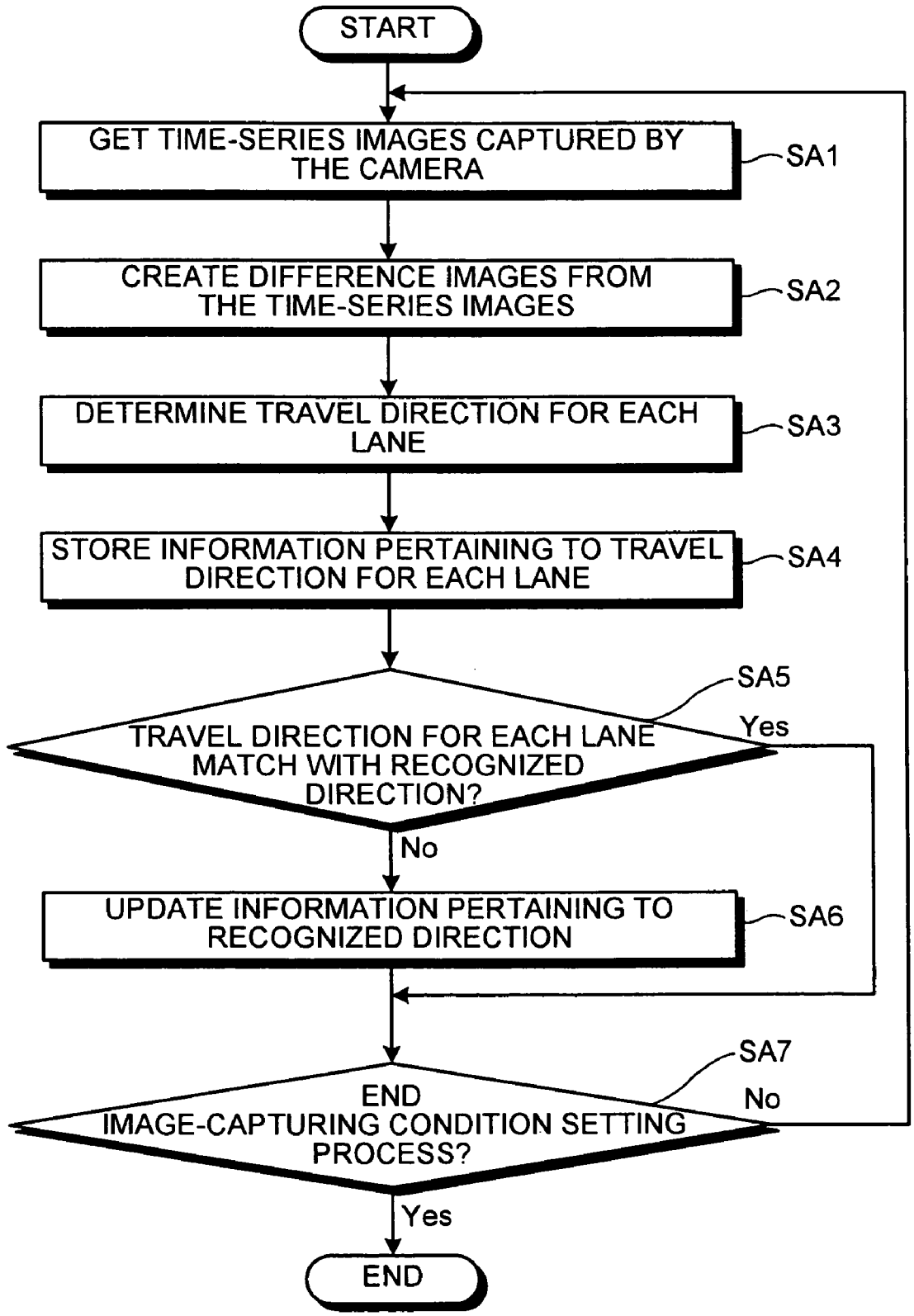
FIG. 9 is a flowchart of a process procedure for image-capturing condition setting according to the first embodiment.

The process sequence of the image-capturing condition setting process according to the first embodiment is explained next. FIG. 9 is a flowchart of a process procedure for image-capturing condition setting according to the first embodiment. The travel direction detecting unit 124b of the recognizing unit 12a first obtains the time-series images captured by the camera 10a from the image data 123a (Step SA1).

The travel direction detecting unit 124b then creates difference images by carrying out a difference process on the time-series images (Step SA2). The travel direction detecting unit 124b then assesses the travel direction for each lane (Step SA3). Next, the travel direction detecting unit 124b stores information pertaining to the travel direction for each lane in the travel direction data 123b (Step SA4).

The image-capturing condition setting unit 124d checks whether the information pertaining to the travel direction of each lane stored in the travel direction data 123b matches with the information pertaining to the recognized direction stored in the image-capturing condition data 123c (Step SA5). If the answer to Step. SA5 is "Yes", the process progresses to Step SA7.

If the information pertaining to travel direction of each lane does not match with the information pertaining to the recognized direction ("No" in Step SA5), the image-capturing condition setting unit 124d updates the information pertaining to the recognized direction of the image-capturing condition data 123c (Step SA6).

The travel direction detecting unit 124b then checks whether an instruction for discontinuing the image-capturing condition setting process has been received (Step SA7). If no instruction for discontinuation is received ("No" in Step SA7), the process returns to Step SA1 to repeat the subsequent steps. If the instruction for discontinuation is received ("Yes" in Step SA7), the image-capturing condition setting process ends there.

A character recognition process takes place parallel to the image-capturing condition setting process described above. The image-capturing condition set by the image-capturing condition setting process immediately reflects on the control of the image-capturing by the camera 10a. The images of the vehicle captured based on the image-capturing condition are stored as the image data 123a. At the same time, the character recognition process is carried out on the stored images.

According to the first embodiment, the storage unit 123 of the recognizing unit 12a receives the information pertaining to the travel direction of the vehicles and stores the received information as travel direction data 123b. The image-capturing condition setting unit 124d sets the conditions for capturing the images of the license plate of the vehicles based on the information pertaining to the travel direction of vehicles stored in the travel direction data 123b. Consequently, when there is a change in the travel direction, appropriate conditions can be set for capturing the images of the license plate of the vehicles.

Further, according to the first embodiment, the travel direction detecting unit 124b of the recognizing unit 12a detects the travel direction of the vehicles. The storage unit 123 receives and stores the information pertaining to the detected travel direction of the vehicles as the travel direction data 123b. Consequently, when there is a change in the travel direction, appropriate conditions are set for capturing the images of the license plate of the vehicles.

The first embodiment, the information pertaining to the travel direction of the vehicles is obtained by analyzing captured time-series images. However, a change schedule of travel direction of each lane may be prestored in the recognizing unit and the travel direction for each lane may be detected by referring to this change schedule. In a second embodiment of the present invention, an instance where the change schedule is prestored in recognizing unit is explained.

Figure 10:
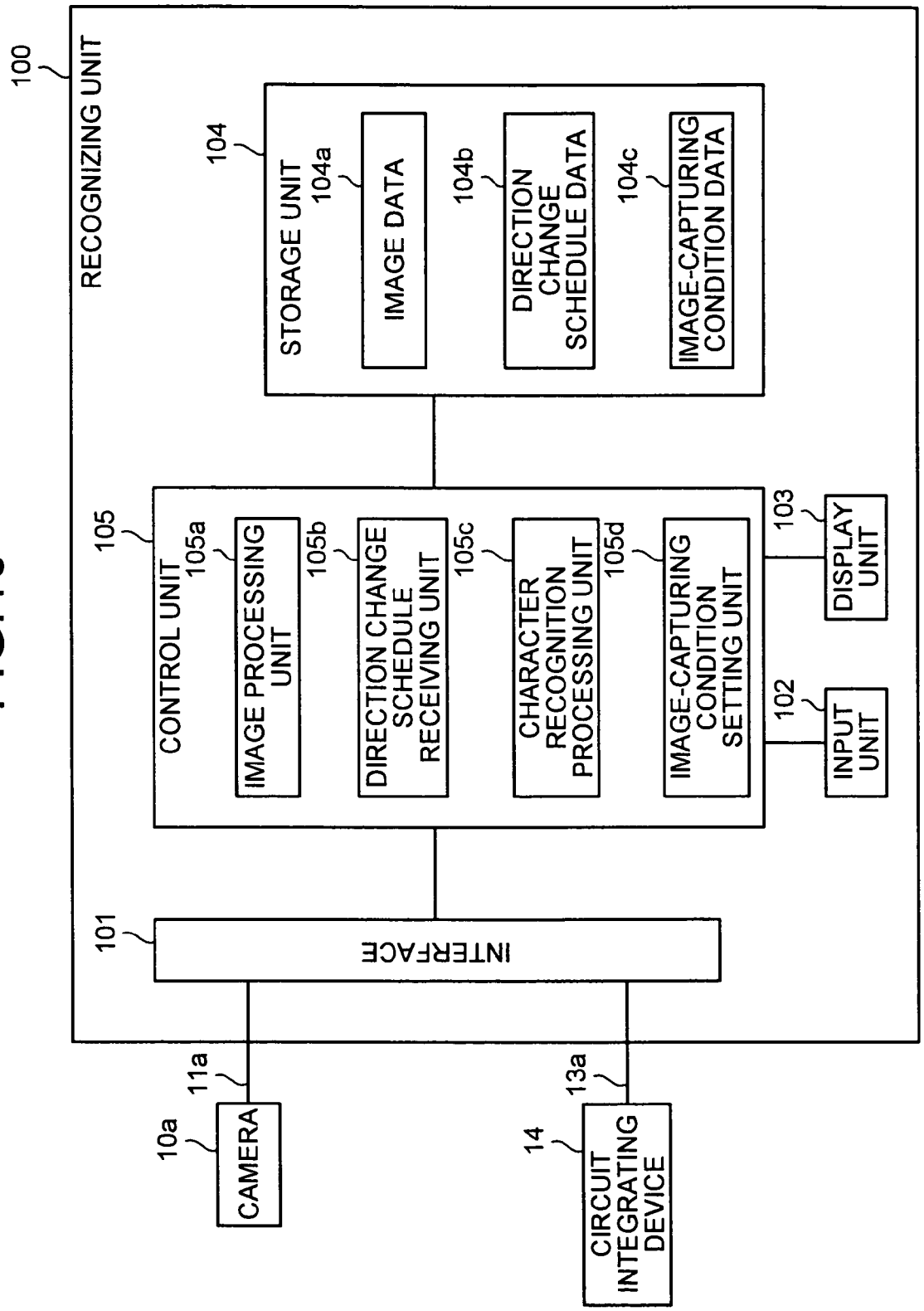
FIG. 10 is a block diagram of a recognizing unit 100 according to a second embodiment of the present invention.

FIG. 10 is a block diagram of a recognizing unit 100 according to the second embodiment. Explanations of the units that are functionally identical to the units of the recognizing unit 12a shown in FIG. 3 are omitted. The recognizing unit 100 includes an interface 101, an input device 102, a display unit 103, a storage unit 104, and a control unit 105.

The interface 101 is a network interface that exchanges data with the camera 10a via the NTSC signal line 11a and with the circuit integrating device 14 via the dedicated line 13a. The input device 102 is an input device such as a keyboard, mouse. The display unit 103 is a display device such as a monitor.

The storage unit 104 is a storage device such as a hard disk device, memory. The storage unit 104 exchanges data with the control unit 105. The storage unit 104 stores image data 104a, change schedule data 104b, and image-capturing condition data 104c.

The image data 104a is a time-series image data captured by the camera 10a. The change schedule data 104b is data pertaining to the change schedule of the travel direction of each lane.

FIG. 11 is a table of an example of change schedule data 104b shown in FIG. 10. The change schedule data 104b is data pertaining to lane number, time slot, and travel direction.

Lane number pertains to an identification number that is assigned to a lane. Travel direction is a numerical representation of the direction of vehicular movement. For instance, an up direction of the street is represented by "0", and a down direction is represented by "1". In the example shown in FIG. 11, the travel direction of lane "2" changes from "1" to "0" at 10 o'clock.

Referring back to FIG. 10, the image-capturing condition data 104c is data pertaining to conditions set for the camera for capturing the image of the license plate of vehicles and is identical to the image-capturing condition data 123c shown in FIG. 5.

The control unit 105 controls the entire recognizing unit 100 and includes a captured image processing unit 105a, a change schedule receiving unit 105b, a character recognition processing unit 105c, and an image-capturing condition setting unit 105d.

The captured image processing unit 105a obtains the time-series images captured by the camera 10a and stores them as the image data 104a. The captured image processing unit 105a refers to the image-capturing condition data 104c and controls the camera 10a so that the camera 10a captures the image of the license plate of the vehicle at a predetermined timing according to the travel direction of the vehicle.

The change schedule receiving unit 105b receives information pertaining to the change schedule of the travel direction of vehicles traveling in each lane input through the input unit 102 and stores this information as the change schedule data 104b. Alternatively, the change schedule receiving unit 105b may receive information pertaining to change schedule transmitted from a not shown control unit via a network.

The character recognition processing unit 105c detects image areas corresponding to each lane, such as the image areas 65a and 65b shown in FIG. 6, by analyzing the time-series images of the vehicles stored in the image data 104a.

The character recognition processing unit 105c creates difference images (that is, difference image obtained from an image captured at time t and another captured at time t−1). The character recognition processing unit 105c then creates a superimposed image by superposing the difference images, and based on the superimposed image, sets an image area of each of the lanes.

The character recognition processing unit 105c executes character recognition by first detecting the image of the vehicle license plate for each set image area and then carrying out character recognition for the registration information on the license plate. The character recognition processing unit 105c then transmits to the circuit integrating device 14 the character-recognized registration information along with the place and time of the image-capturing.

The image-capturing condition setting unit 105d sets the conditions for the camera 10a to capture images based on the information pertaining to the change schedule of the vehicular travel direction stored in the change schedule data 104b.

The image-capturing condition setting unit 105d obtains the current time from a not shown clock and assesses in which of the time slots stored in the change schedule data 104b the current time falls. The image-capturing condition setting unit 105d then obtains the data pertaining to the travel direction corresponding to the time slot into which the current time falls and checks if the obtained data pertaining to the travel direction matches with the data pertaining to the recognized direction stored in the image-capturing condition data 104c.

If the obtained data pertaining to the travel direction does not match the data pertaining to the recognized direction stored in the image-capturing data 104c, the image-capturing condition setting unit 105d carries out an update process. That is, the image-capturing condition setting unit 105d updates the data pertaining to the recognized direction stored in the image-capturing condition data 104c with the obtained data related to the travel direction.

Figure 12:
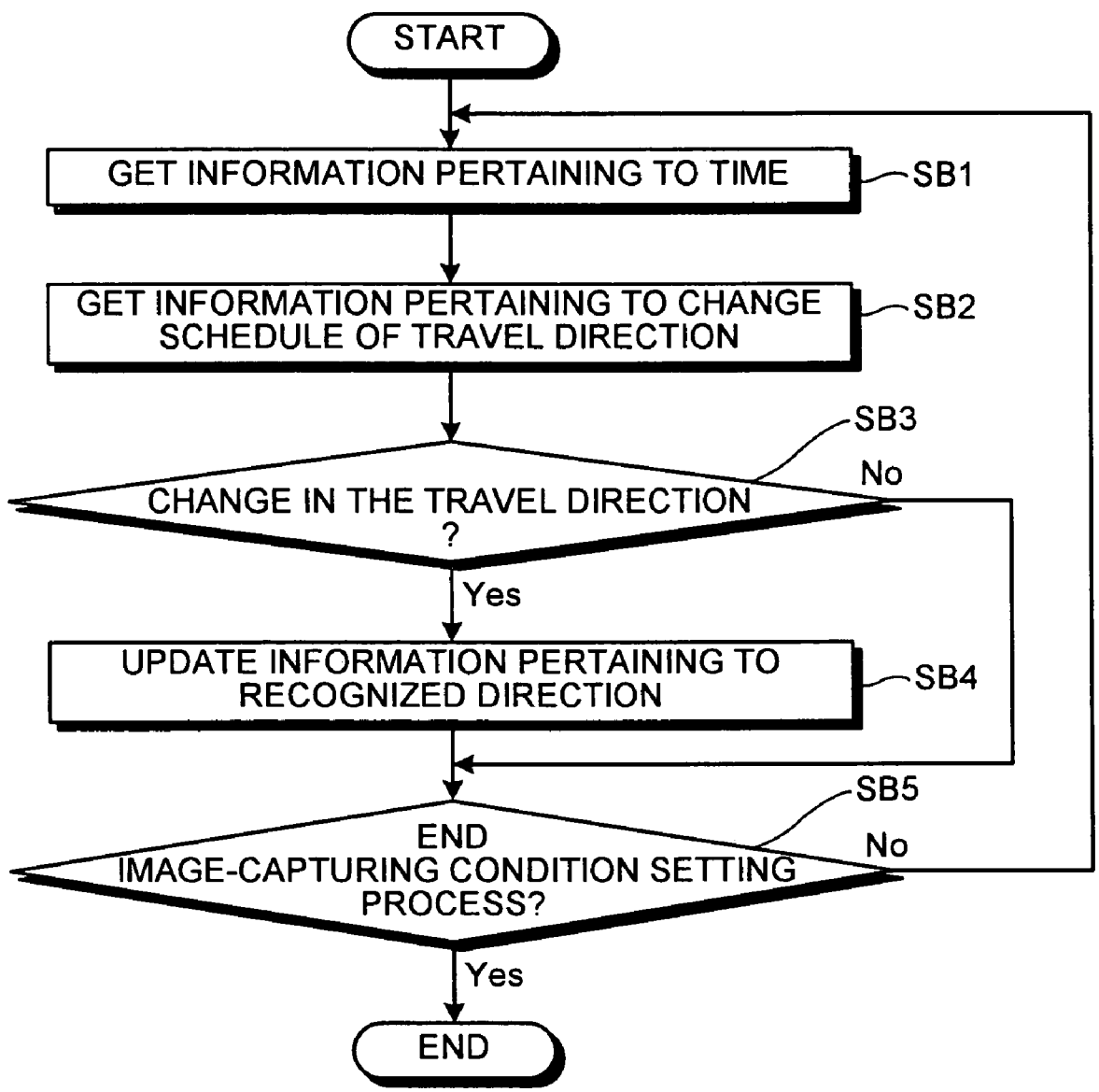
FIG. 12 is a flowchart of a process procedure for image-capturing condition setting process according to the second embodiment.

The process sequence of the image-capturing condition setting process according to the second embodiment is explained next. FIG. 12 is a flowchart of a process procedure for image-capturing condition setting process according to the second embodiment. The change schedule data 104b is assumed to be prestored in the storage unit 104.

The image-capturing condition setting unit 105d of the recognizing unit 100 first gets the information related to time from the clock (Step SB1). The image-capturing condition setting unit 105d then obtains from the change schedule data 104b the information related to the change schedule of the travel direction of each lane (Step SB2).

The image-capturing condition setting unit 105d then checks, based on the information pertaining to the change schedule and time, whether there is a change in the travel direction (Step SB3). If there is no change in the travel direction ("No" in Step SB3), the process advances to Step SB5.

If there is a change in the travel direction ("Yes" in Step SB3), the image-capturing condition setting unit 105d carries out the process of update of the information pertaining to the recognized direction stored in the image-capturing condition data 104c (Step SB4).

The image-capturing condition setting unit 105 then checks whether an instruction for discontinuing the image-capturing condition setting process has been received (Step SB5). If no instruction for discontinuation is received ("No" in Step SB5), the process returns to Step SB1 to repeat the subsequent steps. If the instruction for discontinuation is received ("Yes" in Step SB5), the image-capturing condition setting process ends there.

To sum up, in the second embodiment, the storage unit 104 of the recognizing unit 100 receives the information pertaining to the change schedule of the vehicular travel direction and stores the received information in the change schedule data 104*b*. The image-capturing condition setting unit 105*d* sets the conditions for capturing the images of the license plate of the vehicles based on the information pertaining to the change schedule stored in the change schedule data 104*b*. Consequently, the vehicular travel direction can be efficiently detected based on the change schedule and appropriate conditions can be set for capturing the image of the license plate of the vehicles.

According to the present embodiment, a program for realizing all the functions of the character recognition system may be recorded in a computer-readable recording medium, and the computer may realize all the functions by reading the program recorded in the recording medium.

Figure 13:
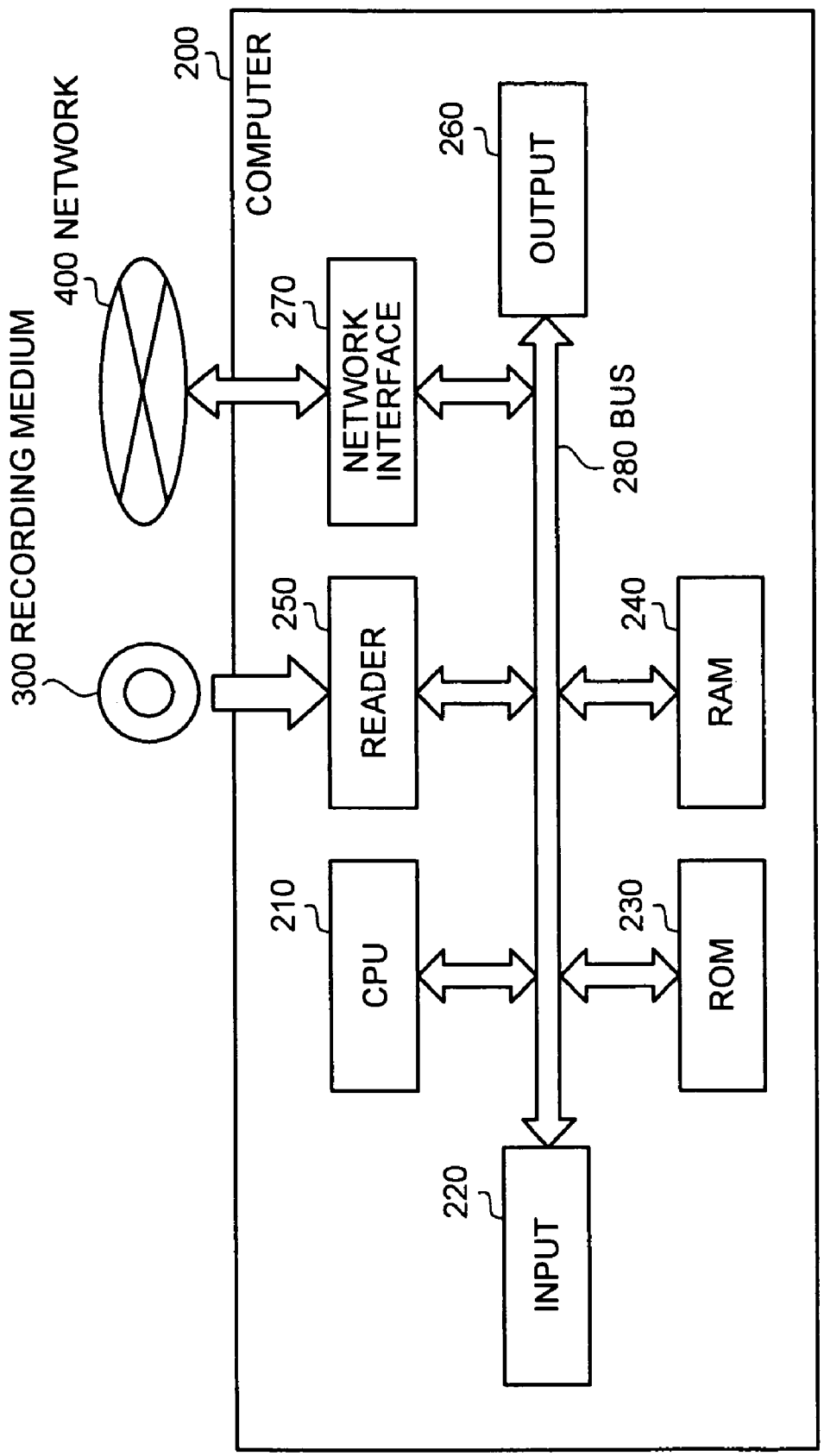
FIG. 13 is a block diagram of a computer 200 to realize functions of a character recognition system.

FIG. 13 is a block diagram of a computer 200 to realize functions of a character recognition system. The computer 200 includes a central processing unit (CPU) 210 that executes the program, a device for input 220 such as a keyboard, mouse, etc., a read only memory (ROM) 230 that stores various types of data, a random access memory (RAM) 240 that stores calculation parameters, etc., a reader 250 that reads from a recording medium 300 the program that realizes the functions of the character recognition system, a device for output 260 such as a printer, etc., a network interface 270 that carries out data exchange between the computer 200 and other computers via a network 400, and a bus 280 that connects all the devices of the computer 200.

The CPU reads by means of the reader 250 the program recorded in the recording medium 300, and realizes the functions by executing the program. The recording medium 300 may be an optical disk, flexible disk, CD-ROM, hard disk, and the like. The program may also be read into the computer 200 through the network 400 after another computer connected to the network 400 reads the recording medium 250.

In the present embodiment, one camera is installed to monitor a two-lane street, the traffic flow being in opposite directions in the two lanes. However, the street may be a single-lane street or a street with three or more lanes.

Figure 14:
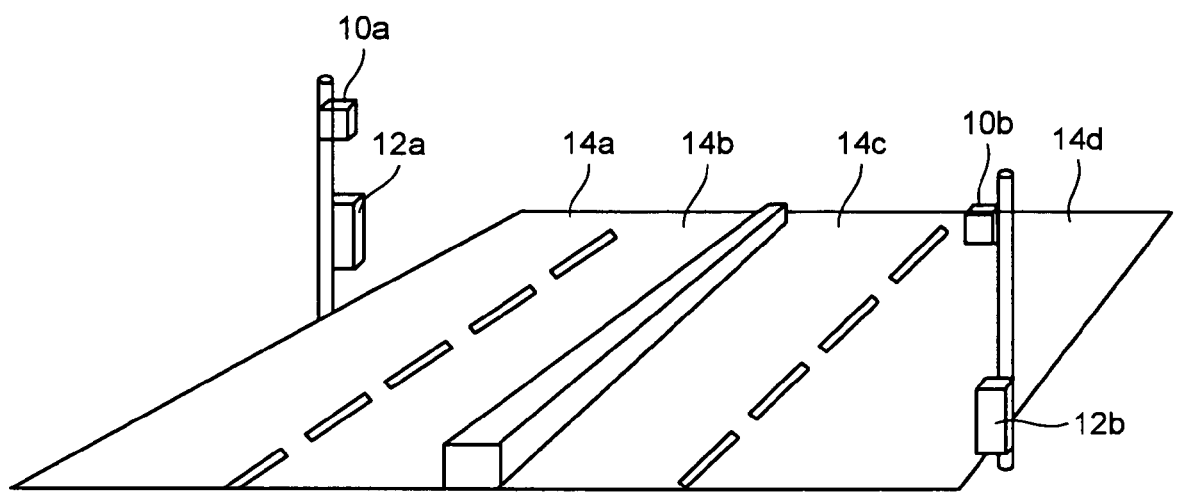
FIG. 14 is a schematic for illustrating placements of the cameras 10a and 10b and the recognizing units 12a and 12b on a four-lane road.

FIG. 14 is a schematic for illustrating placements of the cameras 10*a* and 10*c* and the recognizing units 12*a* and 12*b* on a four-lane road. In this example, the camera 10*a* and the recognizing unit 12*a* carry out the reading process of the registration numbers of vehicles in the lanes 14*a* and 14*b*, and the camera 10*b* and the recognizing unit 12*b* carry out the reading process of the registration numbers of the vehicles in the lanes 14*c* and 14*d*.

The character recognition system according to the present embodiments carries out a reading process of the registration information on the license plate of vehicles such as automobiles. However, the character recognition system may be implemented to carry out the reading process of information such as train number, etc. of other moving object such as trains.

All the automatic processes explained in the present embodiment can be, entirely or in part, carried out manually, and vice versa. The sequence of processes, the sequence of controls, specific names, and data including various parameters can be changed as required unless otherwise specified.

The constituent elements of the device illustrated are merely conceptual and may not necessarily physically resemble the structures shown in the drawings. For instance, the device need not necessarily have the structure that is illustrated. The device as a whole or in parts can be broken down or integrated either functionally or physically in accordance with the load or how the device is to be used.

The process functions of the device can be wholly or partially realized by the CPU or a program run by the CPU or can be realized by hardware through wired logic.

According to the present invention, when there is a change in the travel direction of a moving object, appropriate conditions can be set for capturing the identification data of the moving object.

According to the present invention, when there is a change in the travel direction of a moving object, the travel direction is detected and appropriate conditions can be set for capturing the identification data of the moving object.

According to the present invention, the travel direction of the moving object is efficiently detected based on a change schedule, and appropriate conditions can be set for capturing the identification data of the moving object.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus for setting an image-capturing condition, under which a camera is to capture an image of a moving object, the image including identification data for identifying the moving object, comprising:

a storing unit that stores current travel direction data indicating whether the moving object is traveling in a first direction or a second direction opposite to the first direction, and image capturing condition data including referenced travel direction data;

an image-capturing condition setting unit that compares the current travel direction data with the referenced travel direction data and replaces the referenced travel direction data with the current travel direction data if the referenced travel direction data does not coincide with the current travel direction data; and an image-capturing processing unit that refers to the image capturing condition data, determines whether the referenced travel direction data indicates that the moving object is traveling in the first direction or the second direction, and instructs the camera to capture the image when a front portion of the moving object reaches a first line if the referenced travel direction data is determined to indicate that the moving object is traveling in the first direction and instructs the camera to capture the image when a back portion of the moving object reaches a second line if the referenced travel direction data is determined to indicate that the moving object is traveling in the second direction.

2. The apparatus according to claim 1, further comprising a travel direction detecting unit that detects a traveling direction of the moving object to obtain the current travel direction data.

3. The apparatus according to claim 1, wherein the current travel direction data comprises direction change schedule data including different time slots and a travel direction allocated to each time slot.

4. The apparatus according to claim 3, wherein the image-capturing condition setting unit refers to the direction change schedule data, and obtains, as the current travel direction data, the travel direction allocated to one of the different time slots corresponding to a current time from the direction change schedule data.

5. A method of setting an image-capturing condition under which a camera is to capture an image of a moving object, the image including identification data for identifying the moving object, comprising:
   storing current travel direction data indicating whether the moving object is traveling in a first direction or a second direction opposite to the first direction, and image capturing condition data including referenced travel direction data;
   comparing the current travel direction data with the referenced travel direction data;
   replacing the referenced travel direction data with the current travel direction data if the referenced travel direction data does not coincide with the current travel direction data;
   determining whether the referenced travel direction data indicates that the moving object is traveling in the first direction or the second direction;
   instructing the camera to capture the image when a front portion of the moving object reaches a first line if the referenced travel direction data is determined to indicate that the moving object is traveling in the first direction; and
   instructing the camera to capture the image when a back portion of the moving object reaches a second line if the referenced travel direction data is determined to indicate that the moving object is traveling in the second direction.

6. The method according to claim 5, further comprising detecting a traveling direction of the moving object to obtain the current travel direction data.

7. The method according to claim 5, wherein the current travel direction data comprises direction change schedule data including different time slots and a travel direction allocated to each time slot.

8. The method according to claim 7, further comprising:
   obtaining, as the current travel direction data, the travel direction allocated to one of the different time slots corresponding to a current time from the direction change schedule data.

9. A computer-readable recording medium storing a program that causes a computer to execute a process of setting an image-capturing condition under which a camera is to capture an image of a moving object, the image including identification data for identifying the moving object, the process comprising:
   storing current travel direction data indicating whether the moving object is traveling in a first direction or a second direction opposite to the first direction, and image capturing condition data including referenced travel direction data;
   comparing the current travel direction data with the referenced travel direction data;
   replacing the referenced travel direction data with the current travel direction data if the referenced travel direction data does not coincide with the current travel direction data;
   determining whether the referenced travel direction data indicates that the moving object is traveling in the first direction or the second direction;
   instructing the camera to capture the image when a front portion of the moving object reaches a first line if the referenced travel direction data is determined to indicate that the moving object is traveling in the first direction; and
   instructing the camera to capture the image when a back portion of the moving object reaches a second line if the referenced travel direction data is determined to indicate that the moving object is traveling in the second direction.

10. The computer-readable recording medium according to claim 9, further causing a computer execute a process comprising:
    detecting a traveling direction of the moving object to obtain the current travel direction data.

11. The computer-readable recording medium according to claim 9, wherein the current travel direction data comprises direction change schedule data including different time slots and a travel direction allocated to each time slot.

12. The computer-readable recording medium according to claim 11, further causing a computer execute a process comprising:
    obtaining, as the current travel direction data, the travel direction allocated to one of the different time slots corresponding to a current time from the direction change schedule data.

13. A method of capturing an image, comprising:
    storing, at a storage unit, information related to a direction of travel of a moving object including whether the direction of travel is a first direction or a second direction opposite to the first direction;
    setting, at a setting unit, a condition for capturing the image, which includes data used to identify the moving object, based upon the direction stored in the storage unit;
    changing, at the setting unit, a position of a boundary line most appropriate for capturing the image when the storage unit receives information indicating that the direction of travel has changed from the first direction to the second direction or from the second direction to the first direction; and
    directing a camera to capture the image based upon the change in position of the boundary line.

* * * * *